Patented Apr. 21, 1931

1,801,695

UNITED STATES PATENT OFFICE

KARL SCHIRMACHER, OF FRANKFORT-ON-THE-MAIN-HOCHST, BERTHOLD STEIN, OF ELBERFELD, AND KONRAD STENGER, OF FRANKFORT-ON-THE-MAIN, GERMANY, ASSIGNORS TO GENERAL ANILINE WORKS, INC., OF NEW YORK, N. Y., A CORPORATION OF DELAWARE

MANUFACTURE OF BIS-AMINOPHENYL ANTHRACENE AND DERIVATIVES

No Drawing. Original application filed July 21, 1926, Serial No. 124,096, and in Germany July 30, 1925. Divided and this application filed May 24, 1929. Serial No. 365,782.

Our present invention relates to the manufacture of new anthraquinone derivatives by heating an anthraquinone or a substitution derivative thereof with a salt of an aromatic amine. Two series of anthraquinone derivatives may be obtained in this manner, namely bis-aminoarylanthrones and bisaminoarylanthracenes, their quantity varying according to the conditions of the reaction. When the conditions are not very drastic the products are mainly bis-aminoarylanthrones which are readily diazotizable, the first member of the series being probably represented by the following formula:

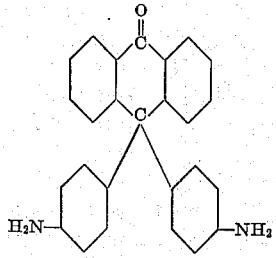

The present invention relates to bis-aminoarylanthracenes having the following formula:

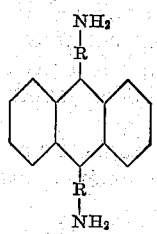

wherein R stands for an aromatic nucleus which may be substituted and in which the anthracene nucleus may be substituted by a substituent of the group consisting of alkyl and amino.

These products are obtained when the working conditions are more drastic.

For producing the bis-aminoarylanthrones it is preferable to operate at a temperature below 180° C. and to continue the reaction for a comparatively short time, whereas for producing the bis-aminoarylanthracenes temperatures above 185° C. may usefully be employed. The temperatures named are not to be regarded as constants, since they may be varied accordingly as the time occupied by the reaction is diminished or increased. We have furthermore found that the above described 9.9-bis-aminoarylanthrones are converted into 9.10-bis-aminoarylanthracenes by heating them with a condensing agent which simultaneously acts as a reducing agent such, for instance, as aniline salts, stannous chloride, or the like.

The new derivatives are suitable for use as parent materials in making dyestuffs and other products.

The following examples illustrate our invention; the parts being by weight:—

*Example 1.*—A mixture of 200 parts of anthraquinone, 500 parts of aniline hydrochloride and 1000 parts of aniline is heated in an oil bath while stirring for about three hours, the temperature of the oil bath being 175° C. To the mass an excess of alkali is added and any unaltered aniline is removed by distillation with steam. The residue is dissolved in dilute hydrochloric acid, filtered, from any unaltered anthraquinone and from the filtrate the new compound is precipitated by addition of alkali, and, after drying, recrystallized from boiling nitrobenzene.

The bis-aminophenylanthrone obtained in this manner is a gray green crystalline powder, melting at 298° C. It is readily diazotizable and has a tendency to become greenish blue when exposed to air. It is insoluble in water and in the usual solvents of low boiling point, but freely soluble in boiling xylene and nitrobenzene. It dissolves easily to a colorless solution in dilute mineral acids; these solutions also show a tendency to become blue green when exposed to air. Its diazo and tetrazo solutions readily yield dyestuffs with coupling components. If in the foregoing example ortho-toluidine hydrochloride is substituted for the aniline hydrochloride, there is obtained bis-orthoaminotolylanthrone, melting in the form of a brown powder at 255° C. It is readily diazotizable. Its properties closely resemble those of the aniline derivative and its salts, both in substance and in solution, have tendency to become reddish when exposed to air. In like manner there may be prepared from ortho-anisidine hydrochloride the bis-orthoamino-anisilanthrone.

If in the foregoing example there is used, instead of anthraquinone, 1-aminoanthraquinone, there is obtained bis-aminophenyl-1-aminoanthrone. It crystallizes from boiling xylene in brown red prisms which decompose when they melt. It dissolves in dilute mineral acid freely to a brown red solution. The isomeric bis-aminophenyl-2-aminoanthrone obtained from 2-amino-anthraquinone and aniline hydrochloride crystallizes from boiling xylene in bright yellow crystals which melt while decomposing. It dissolves freely in dilute mineral acids to a bright yellow solution.

Other substituted anthraquinone derivatives, such as methylanthraquinone, yield corresponding derivatives when treated in like manner.

*Example 2.*—The same materials as used in Example 1 and in the same proportions are heated together for 1½ hours while stirring, the temperature of the oil bath being 180° C. The mass is worked up in the same manner as in the preceding example.

From the residue which is insoluble in hydrochloric acid, a somewhat impure 9:10-bis-aminophenylanthracene is obtained after unaltered anthraquinone has been removed by vatting.

*Example 3.*—20 parts of anthraquinone, 50 parts of aniline hydrochloride and 100 parts of aniline are heated together in an oil bath, while stirring, for 3 hours, the internal temperature being about 185° C. and the heating being such that the aniline remains gently boiling. The mass becomes gradually darker and after 1½–2 hours crystals separate from the melt, which has become thick. Heating is continued for another hour, alcohol is added, the whole filtered and the solid matter washed with some alcohol. The crystals thus obtained are the hydrochloride of 9:10-bis-aminophenylanthracene. They are boiled with water, filtered and washed until neutral. This substance has the following formula:

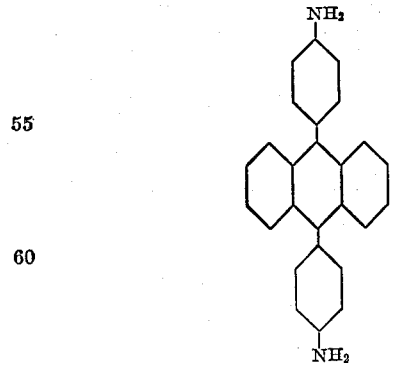

It crystallizes from pyridine or chlorobenzene in pale yellow leaflets which melt above 300° C. In concentrated sulfuric acid it dissolves to a yellow solution; the color diminishes on standing or on gently warming and the feebly colored solution now exhibits a strong blue fluorescence. From the alcoholic filtrate obtained in the operation of working up a small quantity of bis-aminophenylanthrone can still be obtained.

*Example 4.*—20 parts of anthraquinone, 60 parts of ortho-toluidine hydrochloride and 100 parts of orthotoluidine are heated together in the oil bath for three hours, while stirring, the internal temperature being about 190° C. The mass is dark and formation of magenta occurs as a secondary reaction. Separation of crystals is not to be observed. The working up is similar to that described in Example 1. The residue consists of a gray brown powder which can be re-crystallized with difficulty. It melts above 300° C.

It dissolves to a yellow brown solution in concentrated sulfuric acid which soon fades whereupon the slightly colored solution exhibits a blue fluorescence.

*Example 5.*—20 parts by weight of 9.9-bis-aminophenylanthrone are heated to strong boiling with 100 parts of hydrochloride of aniline and 200 parts of aniline for about three hours while stirring. The molten mass is stirred, while still hot, in an excess of caustic soda solution and the aniline is expelled by means of steam. If required the residue is boiled up with dilute hydrochloric acid in order to remove the unattacked parent material. The final residue consists of crude 9:10-bis-aminophenylanthracene.

In the foregoing examples the proportions by weight can be varied within wide limits; instead of the hydrochlorides of aromatic amines the salts formed by other mineral acids with aromatic amines may be used.

This application is a division of our U. S. Patent No. 1,724,045, issued August 13, 1929.

We claim:

1. As new products the anthracene derivatives having the general formula:

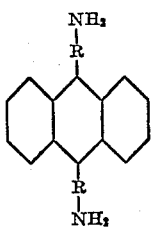

wherein R stands for an aromatic nucleus of the benzene series which may be substituted and in which the anthracene nucleus may be substituted by a substituent of the group consisting of alkyl and amino.

2. As new products the anthracene derivatives having the general formula:

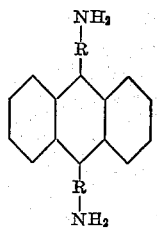

wherein R stands for an aromatic nucleus of the benzene series which may be substituted.

3. As a new product the bis-aminophenyl-anthracene of the following formula:

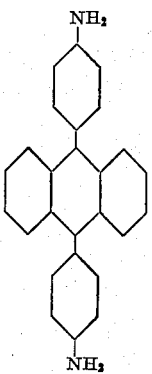

crystallizing from chlorobenzene in pale yellow leaflets melting at above 300° C. dissolving in concentrated sulfuric acid to a yellow solution whose color diminishes on standing or on gently warming the feebly colored solution then exhibiting a strong blue fluorescence.

In testimony whereof, we affix our signatures.

KARL SCHIRMACHER. [L. S.]
BERTHOLD STEIN. [L. S.]
KONRAD STENGER. [L. S.]